Aug. 16, 1932.   F. F. WULF   1,871,644
DRAFT REGULATOR
Filed July 19, 1930
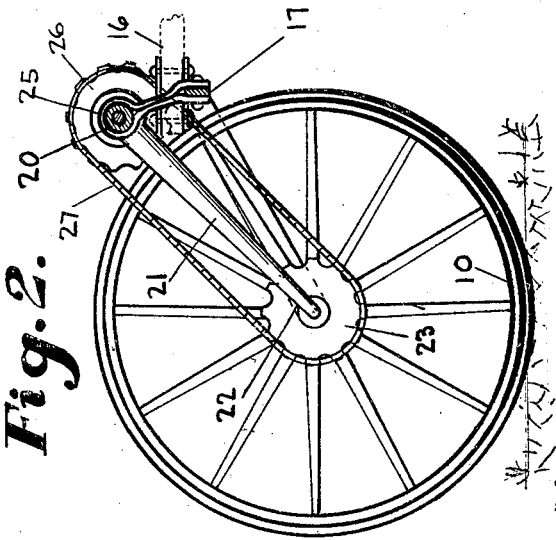
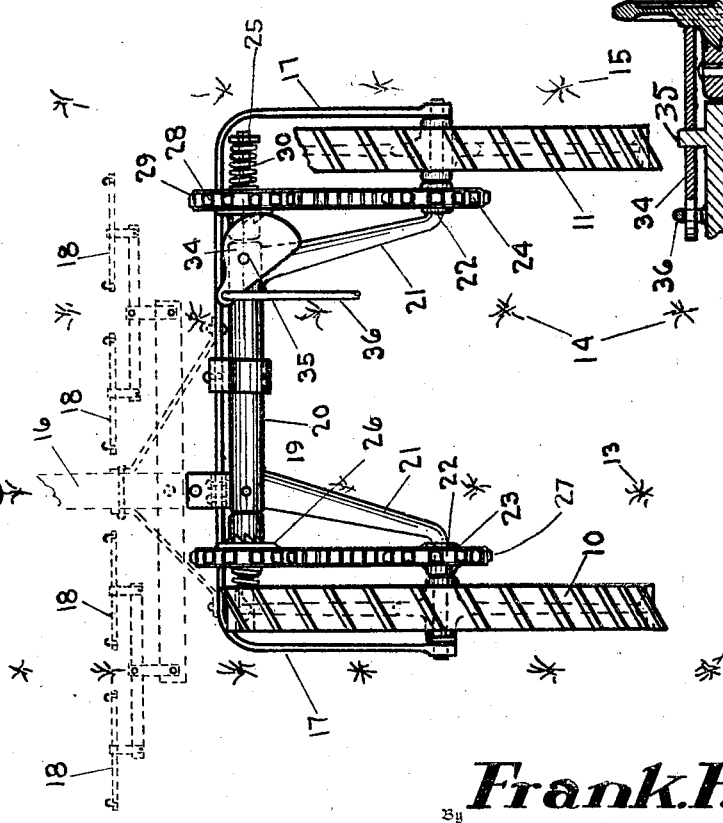
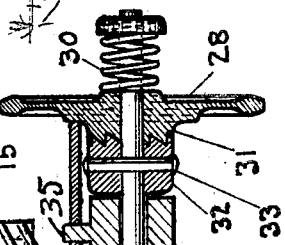
Inventor
Frank F. Wulf
By Hiram A. Sturges, Attorney Patented Aug. 16, 1932

1,871,644

UNITED STATES PATENT OFFICE

FRANK F. WULF, OF OMAHA, NEBRASKA

DRAFT REGULATOR

Application filed July 19, 1930. Serial No. 469,024.

This invention relates to draft regulators adapted to be used for many purposes and particularly of advantage when used upon vehicles and agricultural implements such as plows, listers and cultivators attached to and drawn by wheeled vehicles.

In the use of agricultural implements mounted upon or drawn by vehicles, it frequently occurs that, during operation, one of the wheels engages in a furrow, and traction provided by the two wheels are not equal, with resulting inequality of draft. Also very often, the power employed consists of four horses moving side by side for drawing listers or cultivators, with the result that one or more of the horses will travel on cultivated ground while the others travel on more solid ground. By use of the herein described evener all of the horses may travel adjacent to the "near side," and when plowing, the horses may all travel upon the "land side".

The invention includes certain features for convenience in operation when "turning about" at the end of a field, and with the foregoing objects in view the invention presents a new and useful construction, combination and arrangement of parts as described herein and claimed, and as illustrated in the accompanying drawing, it being understood that changes may be made in form, size, proportions and minor details, said changes being within the scope of the invention as claimed.

In the drawing, Fig. 1 is a broken away plan view illustrating one embodiment of the invention. Fig. 2 is a sectional view through the sleeve of the arcuate casting. Fig. 3 is a sectional detail of the clutch.

Referring now to the drawing for a more particular description, the invention is shown and described in connection with a pair of traction wheels 10 and 11 depended upon for traction and for drawing a cultivator or lister (not shown) for cultivating the ground between the rows 12, 13, 14 and 15 shown in Fig. 1 of the drawing, these being rows of growing corn or the like.

In order that the objects of the invention may be attained as first mentioned, the tongue 16 may be attached to that part of the draw-bar 17 closely adjacent to the "near side" of the vehicle, and since the whiffletrees 18 will all be disposed between rows which have not been cultivated, it will not be necessary for any of the horses (not shown) to travel upon the cultivated ground.

In order that a part of the power directed to rotate the wheel 10 may be transmitted to wheel 11 to cause uniformity, I provide an arcuate casting 19 having a sleeve 20 at its middle, said sleeve having a pair of arms 21 at its ends terminating in a pair of spindles 22 on which the wheels 10 and 11 are journalled.

Numeral 23 indicates a sprocket wheel which is rigid with the wheel 10 and a sprocket wheel 24 is rigidly secured to the wheel 11. Numeral 25 indicates a shaft which extends through the sleeve and its ends project beyond the ends of the sleeve. Upon that end of the shaft adjacent to the wheel 10 is rigidly mounted a sprocket wheel 26 and a sprocket chain 27 is mounted on the sprocket wheels 23 and 26.

Numeral 28 indicates a sprocket wheel which is journalled on the end of the shaft 25, and by means of a sprocket chain 29 a rotation of the traction wheel 11 will cause the sprocket wheel 28 to be rotated.

As best shown in Fig. 3 the sprocket wheel 28 is normally pressed inwardly upon the shaft 25 by means of a spring 30 and the inner side of this sprocket wheel is provided with teeth 31 to operate as a clutch-member. Numeral 32 indicates a clutch-member which is movable with the shaft 25 since it is secured thereto by a keeper 33. Numeral 34 indicates a cam adapted to be rotated on its pivot 35 and when rotated in one direction by use of its lever 36 it will move the sprocket wheel outwardly from the clutch-member 32 against the force of the spring 30, and while the eccentrically mounted cam remains in this position no rotatable movement of the shaft 25 will be caused by the rotation of the wheel 11.

When "turning about" at the end of a field, the driver, by use of the lever 36, moves the sprocket wheel 28 outwardly, and this operation permits the "off" wheel 11 to rotate faster than the wheel 10. By rotating the cam in an opposite direction the teeth 31 of the sprocket wheel 28 will be moved into engagement with the clutch-member 32 by action of the spring 30.

It will therefore be seen that power may be applied by the tongue to any part of the draw-bar 17 and the result would not be changed for the reason that the wheel 11 must rotate dependingly with the wheel 10. Both of these wheels co-operate to provide a unit of traction and the draft will be equalized so long as the clutch-members engage each other.

The herein described means for controlling the draft operates to great advantage for agricultural purposes, the arcuate form of the casting 19 being needed since it will not be obtrusive to rows of growing corn having a height of two or three feet, and it will be appreciated that it is an advantage to permit horses to travel on the "land side" and not in the furrows or freshly plowed or listed ground.

I claim as my invention,—

A draft regulator, comprising an arched member having an intermediate sleeve portion and end crank portions, a traction wheel mounted on each crank portion, a sprocket wheel on each crank portion connected to its respective traction wheel, a shaft mounted to turn in said sleeve, a clutch member fixed to each end portion of the shaft beyond the sleeve, a sprocket wheel mounted to turn freely on each end portion of the shaft and disposed in line with the sprocket wheels on said crank portions, springs carried on the outer ends of the shaft and bearing against said adjacent sprocket wheels, the sprocket wheels on the shaft having clutch elements for interlocking engagement with said first clutch elements for interlocking the parts for rotation in one direction, chains connecting the alined sprocket wheels, and a cam mounted on one end of the sleeve and disposed at the inner side of one of the sprocket wheels on the shaft for freeing the sprocket wheel from the adjacent clutch element at times.

In testimony whereof, I affix my signature.

FRANK F. WULF.